Patented Apr. 7, 1942

2,278,831

UNITED STATES PATENT OFFICE 2,278,831

PURIFICATION OF ALIPHATIC ACIDS AND ANHYDRIDES

Frank O. Cockerille, Albemarle County, Va., assignor to E. I. du Pont de Nemours & Company, Wilmington, Del., a corporation of Delaware No Drawing. Application March 21, 1941, Serial No. 384,579

8 Claims. (Cl. 260—541)

This invention relates to the purification of aliphatic acid anhydrides and aliphatic acids. More particularly it relates to the treatment of acetic anhydride and acetic acid, to remove therefrom impurities which color and otherwise deleteriously affect the anhydride or acid and products produced therefrom.

It has been determined that the commercial or technical grades of acetic anhydride and acetic acid contain impurities which impart undesirable color to, and impair the clarity of cellulose acetate. This is demonstrated by the fact that when cellulose is acetylated with pure acetic anhydride in the presence of pure acetic acid and sulfuric acid as the catalyst, the cellulose acetate product is much improved in color and clarity as compared with cellulose acetate produced with technical grade of acetic anhydride and/or technical grade of acetic acid.

While for some uses a high degree of clarity and the absence of color in the cellulose ester may be unnecessary, for the production of transparent film such as photographic film and for the production of transparent or lightly tinted plastics, freedom from every trace of color and impurities effecting even a slight clouding or coloring of cellulose acetate becomes important, and it is therefore desirable that those impurities which lend color and deleteriously affect clarity be removed from the anhydride and acid which are to be used in the production of the ester.

An object of this invention is to provide a method for effectively removing from acetic anhydride and acetic acid those impurities which undesirably color and impair the clarity of certain derivatives, particularly cellulose acetate. A further object is to substantially purify technical grades of acetic anhydride and acetic acid by a convenient and economical treatment. A still further object is to purify aliphatic acid anhydrides and aliphatic acids in general. These and other objects will more clearly appear hereinafter.

These objects are accomplished by the process of this invention which, briefly stated, comprises adding a small quantity of yellow phosphorus to the aliphatic acid anhydride or aliphatic acid to be purified, then passing air, oxygen, or gas containing oxygen in contact with the phosphorus-containing mixture for a period of time while agitating and maintaining the same at an elevated temperature sufficient to melt the phosphorus, and thereafter rapidly distilling the anhydride or acid from the mixture.

In the preferred practice of the process the amount of yellow phosphorus used is confined in the range of about 0.025 to about 0.5% by weight of phosphorus based on the weight of the aliphatic acid anhydride or aliphatic acid.

The temperature is preferably maintained within the limits of from about 45° C. to about 80° C.

Also, after the reaction has continued for the desired length of time, it is preferable to neutralize the treated anhydride (or acid) just prior to distillation, for instance with a sodium salt of the aliphatic acid corresponding to the anhydride (or acid) being purified.

The invention is illustrated by the following examples wherein parts are by weight unless otherwise stated.

Example I

To 1000 parts of acetic anhydride, having a permanganate index of $64 \times 10^{-4}$, was added 0.5 part of yellow phosphorus. The anhydride was heated to 50° C., whereupon the phosphorus melted and remained at the bottom of the flask. While agitating the anhydride gently and maintaining a temperature of 50°–60° C., air was passed over the surface at the rate of 25 ml. per minute. After about three hours, the phosphorus was all in solution. The agitation and passage of air were discontinued. After the mixture had remained at about 90° C. for two hours on the steam bath, 2 parts of anhydrous sodium acetate were added and the mixture distilled rapidly with no attempt at fractionation. The brilliantly clear distillate showed a permanganate index of $0.6 \times 10^{-4}$, and gave only a faint yellowish tinge when 5 ml. were treated slowly with 1 ml. 50% perchloric acid without cooling. When mixed slowly (cooling) with an equal volume of conc. sulfuric acid, it remained colorless for several hours.

The "permanganate index" referred to in the foregoing example is a standard index for indicating the purity of acetic anhydride and acetic acid, and is arrived at in accordance with the following procedure described in connection with acetic anhydride:

A small measured or weighed sample of the anhydride is hydrolyzed to acetic acid by treatment with a large excess of dilute sulfuric acid. The dilute acetic acid sulfuric acid solution obtained in this manner is titrated with a solution containing an exactly known amount of potassium permanganate per given volume of the solution, usually about 3.2 grams per liter. When a faint pink color persists for fifteen minutes, the titration is considered to be complete. The volume of solution used during the titration is read and the weight of permanganate contained therein determined. The "permanganate index" is then expressed as "the number of grams of potassium permanganate consumed per gram of anhydride in the titrated sample."

Example II

To 4000 parts of acetic anhydride having a permanganate index of $81 \times 10^{-4}$ were added 4 parts of yellow phosphorus. The anhydride was heated to 75°–80° C. while air was passed in, in such a manner that the phosphorus was agitated continuously. After about four hours, all the phosphorus had either dissolved or changed to an orange-yellow powder which underwent no further change. Heating at about 90° C. was continued for three hours, after which 12 parts of anhydrous sodium acetate were added and the mixture subjected to distillation. The product had a permanganate index of $0.4 \times 10^{-4}$, and gave a yellowish tinge with one-fifth its volume of 50% perchloric acid only after several hours; with an equal volume of sulfuric acid, a faint orange color was discernible after sixteen hours.

Example III

Two thousand (2000) parts of acetic acid having a permanganate index of $3 \times 10^{-4}$ and a freezing point of 15.5° C. were treated at 60°–70° C. with 1 part of yellow phosphorus and air previously dried over calcium chloride until the phosphorus had dissolved. Air was then passed over the surface at a very slow rate for an additional two hours while holding the temperature at 100° C. Anhydrous sodium acetate sufficient to neutralize the mineral acidity was then added and the acetic acid removed by distillation. The distilled acid had a permanganate index of less than $0.1 \times 10^{-4}$ and a freezing point of 15.4° C. It showed no color when treated as above with perchloric and sulfuric acids.

Example IV

Eighteen hundred (1800) parts of acetic acid having a permanganate index of $3 \times 10^{-4}$ and a freezing point of 15.5° C. were mixed with 200 parts of 98% acetic anhydride having a permanganate index of $122 \times 10^{-4}$. One (1) part of yellow phosphorus was added. The temperature was raised to 50° C., after which the mixture was agitated while air was passed over the surface. After the phosphorus was dissolved (about three hours), the product was divided into two equal parts. To one half, 2 parts of sodium acetate were added and the mixture distilled. The product contained 9.3% anhydride and had a permanganate index of $0.4 \times 10^{-4}$. It did not color appreciably when treated with either perchloric acid or sulfuric acid as described in previous examples. The second half was distilled without addition of sodium acetate. While the distillate in this case was quite colorless, it had a permanganate index of $3 \times 10^{-4}$ and was colored pale orange by one-fifth its volume of perchloric acid. Analysis showed 9.0% anhydride. Accordingly, it is clear that neutralization before distillation is the preferred procedure, though considerable purification is gained even without neutralization.

Example V

Conditions were as in Example I, except that 0.5 part of sulfuric acid was used in addition to 0.5 part of yellow phosphorus, and the heating period was omitted after the phosphorus had dissolved. The neutralization was effected by use of 3 parts of sodium acetate. The distillate showed a permanganate index of $0.5 \times 10^{-4}$, and gave somewhat less color with perchloric acid and sulfuric acid than the distillate obtained in Example I.

While the process has been described in the above examples with specific reference to acetic anhydride and acetic acid, it is not so limited and may be applied as well in the purification of all aliphatic acid anhydrides and aliphatic acids such as propionic, butyric, and isobutyric acids and anhydrides. Likewise a wide variation from the exact amounts and conditions of the above examples may be practiced.

Thus, while the amount of yellow phosphorus used in this purification process is preferably in the range from 0.025 to 0.5% based on the weight of the acid or anhydride, some improvement will be obtained in the purity of the product by using a smaller amount than 0.025%. Larger amounts than 0.5% may be used, but there appears to be no advantage in using a greater amount.

The preferred temperature range is from about 45° C. to about 80° C. This is an optimum range in which the purification proceeds most advantageously. Below this range, the phosphorus remains solid and reacts slowly. At higher temperatures (80° C. to 135° C.), the desired reaction still proceeds but the phosphorus dissolves less rapidly, presumably because of the lower solubility of oxygen in acetic anhydride at such temperatures. Some improvement in the purity of aliphatic acid anhydride or aliphatic acid can be obtained by this process in the range of temperatures from room temperature up to the boiling point of the acid or anhydride. At the lower temperature, the phosphorus may be present in the form of fine granules so as to present a relatively large surface to the oxygen-containing medium. However, in view of the longer time required for reaction obviously it is preferred to heat the solution.

Instead of using yellow phosphorus the same general effect is obtained by the use of equivalent amounts of the lower oxides or acids of phosphorus; for instance, phosphorus trioxide, hypophosphorous acid and phosphorous acids may be used without auxiliary oxygen.

The time required for the reaction will, of course, depend upon a number of variables, including the nature of the impurities, the temperature of the treatment, the amount of yellow phosphorus and the like, and may be determined by simple empirical tests in each instance.

The reaction product of phosphorus with impurities seems to be entirely non-volatile under the simplest conditions of distillation. Since it is known that anhydride is not stable under conditions of fractional distillation, the best procedure for separating pure anhydride is to submit the treated anhydride to rapid distillation under a considerably reduced pressure and with no attempt to effect fractionation.

I claim:

1. A process for purifying aliphatic acid anhydrides and aliphatic acids which comprises adding a relatively small amount of yellow phosphorus to a relatively large amount of impure acidic material from the group consisting of aliphatic acid anhydrides and aliphatic acids, contacting the mixture so formed with an oxygen-containing gas, and thereafter rapidly distilling said acidic material from said reaction mixture whereby to obtain the acidic material in substantially pure state.

2. A process for purifying aliphatic acid anhydrides and aliphatic acids which comprises adding a relatively small amount of yellow phosphorus to a relatively large amount of impure acidic material from the group consisting of aliphatic acid anhydrides and aliphatic acids, contacting the mixture so formed with an oxygen-containing gas while maintaining the temperature of said mixture within the range of from about 45° C. to about 80° C., and thereafter rapidly distilling said acidic material from said reaction mixture whereby to obtain the acidic material in substantially pure state.

3. A process for purifying aliphatic acid anhydrides and aliphatic acids which comprises adding a relatively small amount of yellow phosphorus to a relatively large amount of impure acidic material from the group consisting of aliphatic acid anhydrides and aliphatic acids, contacting the mixture so formed with an oxygen-containing gas while maintaining the temperature of said mixture within the range of from about 45° C. to about 80° C., neutralizing the resulting reaction mixture with in inorganic salt of the acidic material, and thereafter rapidly distilling said acidic material from said reaction mixture whereby to obtain the acidic material in substantially pure state.

4. A process according to claim 1 wherein the acidic material is acetic anhydride.

5. A process according to claim 1 wherein the acidic material is acetic acid.

6. A process according to claim 3 wherein the amount of yellow phosphorus added is within the range of from about 0.025% to about 0.5% by weight based on the weight of the acidic material.

7. The process which comprises adding to impure acetic anhydride from about 0.025% to about 0.5% by weight based on the weight of acetic anhydride, of yellow phosphorus, passing air in intimate contact with the resulting mixture, while maintaining said mixture at a temperature within the range of from about 45° C. to about 80° C., neutralizing the resulting reaction mixture with anhydrous alkali-metal acetate, and thereafter rapidly distilling acetic anhydride from said reaction mixture whereby to obtain acetic anhydride substantially free of impurities.

8. The process which comprises adding to impure acetic acid from about 0.025% to about 0.5% by weight based on the weight of acetic acid, of yellow phosphorus, passing air in intimate contact with the resulting mixture, while maintaining said mixture at a temperature within the range of from about 45° C. to about 80° C., neutralizing the resulting reaction mixture with alkali-metal acetate, and thereafter rapidly distilling acetic acid from said reaction mixture whereby to obtain acetic acid substantially free of impurities.

FRANK O. COCKERILLE.